(12) United States Patent
Radcliffe et al.

(10) Patent No.: US 11,536,946 B2
(45) Date of Patent: Dec. 27, 2022

(54) HIGH TEMPERATURE COOLING TUBE FOR BORESCOPE

(71) Applicant: Baker Hughes Holdings LLC, Houston, TX (US)

(72) Inventors: Andrew Bard Radcliffe, Skaneateles, NY (US); Randy H. Roberts, Skaneateles, NY (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/192,692

(22) Filed: Mar. 4, 2021

(65) Prior Publication Data

US 2021/0294090 A1 Sep. 23, 2021

Related U.S. Application Data

(60) Provisional application No. 62/990,666, filed on Mar. 17, 2020.

(51) Int. Cl.
*G02B 23/24* (2006.01)
*G12B 9/06* (2006.01)
*G12B 15/02* (2006.01)

(52) U.S. Cl.
CPC ........... *G02B 23/2476* (2013.01); *G12B 9/06* (2013.01); *G12B 15/02* (2013.01)

(58) Field of Classification Search
None
See application file for complete search history.

(56) References Cited

U.S. PATENT DOCUMENTS

| 4,495,134 A | * | 1/1985 | Ouchi | ..................... B29C 63/18 264/254 |
| 5,788,714 A | | 8/1998 | Ouchi | |

(Continued)

FOREIGN PATENT DOCUMENTS

| JP | 2001-070238 A | 3/2001 |
| WO | 2015-166438 A1 | 11/2015 |

OTHER PUBLICATIONS

No other inspection tool ever comes close; 2000. (Year: 2000).*

(Continued)

*Primary Examiner* — Luis Perez-Fuentes
(74) *Attorney, Agent, or Firm* — Mintz Levin Cohn Ferris Glovsky and Popeo, P.C.

(57) ABSTRACT

A high temperature cooling tube for use with an inspection device is provided. The cooling tube permits operation of the inspection device in environments having a temperature of greater than about 302° F. (150° C.). By providing the capability to inspect equipment in a relatively hot condition, cooling time required before inspection is reduced, overall turnaround time for such inspections is reduced, inspected equipment is placed back into service more quickly, and revenues are increased. In an exemplary embodiment, the cooling tube includes an inner sleeve for protecting the inspection device, a middle sleeve for insulation and air flow, and an outer sleeve for protecting the cooling tube and the inspection device from damage. The middle sleeve can include expanded polytetrafluoroethylene (EPTFE), which protects the inspection device from extreme high temperature working environments, and which permits flexibility. Related apparatuses, systems, techniques and articles are also described.

11 Claims, 3 Drawing Sheets

(56) References Cited

U.S. PATENT DOCUMENTS

| | | | | |
|---|---|---|---|---|
| 6,206,824 | B1* | 3/2001 | Ohara | A61B 1/0011 |
| | | | | 604/524 |
| 7,121,098 | B2* | 10/2006 | Hatcher | F25B 9/04 |
| | | | | 606/15 |
| 7,662,091 | B2* | 2/2010 | Bagley | G02B 23/2492 |
| | | | | 600/149 |
| 9,549,665 | B2* | 1/2017 | Sugisawa | A61B 1/0051 |
| 9,791,091 | B2* | 10/2017 | Yodogawa | F16L 9/22 |
| 10,473,528 | B2* | 11/2019 | Sakami | G02B 7/028 |
| 10,533,901 | B2* | 1/2020 | Wang | G01K 1/14 |
| 2004/0176740 | A1 | 9/2004 | Chouinard | |
| 2005/0165275 | A1 | 7/2005 | Von Felten et al. | |
| 2006/0038988 | A1* | 2/2006 | Thermos | G02B 23/2476 |
| | | | | 356/241.1 |
| 2014/0107630 | A1* | 4/2014 | Yeik | A61F 9/008 |
| | | | | 606/5 |
| 2016/0212335 | A1* | 7/2016 | Baleine | H04N 5/23296 |
| 2021/0294090 | A1* | 9/2021 | Radcliffe | G02B 23/2492 |

OTHER PUBLICATIONS

NPL search at Google Patents; 2022. (Year: 2022).*
International Search Report and Written Opinion for corresponding International Application No. PCT/US2021/022362, dated Jul. 1, 2021, 7 pages.

* cited by examiner

HIGH TEMPERATURE COOLING TUBE FOR BORESCOPE

CROSS-REFERENCE TO RELATED APPLICATIONS

The present application claims priority to U.S. Provisional Application No. 62,990,666 filed Mar. 17, 2020, entitled "HIGH TEMPERATURE COOLING TUBE FOR BORESCOPE," which is hereby incorporated by reference in its entirety.

BACKGROUND

Remote borescope inspection tools are utilized to identify and/or predict equipment failures in the field of industrial equipment in industries such as aerospace, power generation, oil and gas, automotive, food and beverage, and pharmaceutical manufacturing. For example, borescope inspection tools are used to inspect jet aircraft engines, pumps, motors, generators, pulp and paper rollers, gear boxes, pipes, tubes, purity pipes, compressors, large pistons, chillers, valves, gun barrels, mortar tubes, vehicles, shipping containers, and maritime surveying structures. In some implementations, borescopes are used in high temperature environments.

In many industries, reduction of turnaround time due to routine inspection is desirable, i.e., it is desirable to return a given piece of equipment to useful service in as little time as possible while maintaining safety. For instance, in the commercial aircraft industry, commercial aircraft jet engines can be brought in and inspected at an inspection facility during down time, often overnight when demand for the aircraft is relatively low. Commercial aircraft jet engines are known to combust fuel at approximately 2000° C. and the combusted fuel can flow into a turbine at approximately 800° C. to 1800° C. Other applications include industrial scale gas turbines that operate at approximately 2400° C. and require routine inspection. A certain amount of time is required to cool the engine or turbine to a temperature that is safe for an inspector and for the equipment used by the inspector. Current methods and systems for inspecting jet engines and turbines and their internal components are conducted with devices, such as borescopes, and their construction only allows them to withstand relatively low temperatures of about 150° F. (65.6° C.) to about 300° F. (149° C.). Also, with such borescopes, in relatively hot environments, imaging performance can deteriorate at temperatures of about 160° F. (71.1° C.) and damage to the borescope starts to occur at temperatures of about 200° F. (93.3° C.).

SUMMARY

A cooling tube for use with an inspection device is provided. In one embodiment, the cooling tube can include a braided and/or spiral cut inner sleeve formed from tungsten or polytetrafluoroethylene and having an inner lumen extending therethrough and configured to receive an inspection device. The cooling tube can include a middle sleeve formed from an expanded polytetrafluoroethylene disposed around the inner sleeve. The cooling tube can further include a braided and/or spiral cut outer sleeve surrounding the middle sleeve. The outer sleeve can be formed from a braided tungsten. In certain exemplary embodiments, the cooling tube can be configured to operate in environmental temperatures greater than about 302° F. (150° C.). In other aspects, the cooling tube can be flexible.

In one embodiment, the middle sleeve can be a first middle sleeve, and the cooling tube can include a second middle sleeve formed from a spiral cut polytetrafluoroethylene wound around the first middle sleeve and having the braided and/or spiral cut outer sleeve disposed therearound.

In another embodiment, a cooling tube is provided for use in medium duty applications. The braided and/or spiral cut inner sleeve can be omitted, and the inner middle sleeve can be configured to receive a borescope or videoscope.

In other aspects, the cooling tube can include an end cap coupled to a first end of the cooling tube. The end cap can include an opening configured to permit the inspection device to pass therethrough.

Methods of manufacturing a cooling tube for use with an inspection device are also provided. In one embodiment, the method can include braiding and/or spiral cutting tungsten or polytetrafluoroethylene to form a braided and/or spiral cut inner sleeve having an inner lumen extending therethrough. The braided and/or spiral cut inner sleeve can be configured to receive an inspection device. The method can also include covering the inner sleeve with a middle sleeve formed from an expanded polytetrafluoroethylene. The method can further include braiding and/or spiral cutting a fibrous material to form a braided and/or spiral cut outer sleeve surrounding the middle sleeve. The cooling tube can be configured to operate in environmental temperatures greater than about 302° F. (150° C.).

The braided and/or spiral cut material can be formed from nonmetallic material. The inner sleeve can be removed. The lumen can be formed by the middle sleeve. The end cap can be fixedly attached to the inner sleeve. The end cap can have a bore extending therethrough. The end cap can have first, second, and third radially inward facing surfaces that differ in diameter from one another.

In one embodiment, the middle sleeve can be a first middle sleeve, and the method can include wrapping the first middle sleeve with a second middle sleeve formed from spiral cut polytetrafluoroethylene tubing. In other aspects, the method can include capping the inner sleeve, the middle sleeve, and the outer sleeve with an end cap.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope of the present invention is defined solely by the claims.

DETAILED DESCRIPTION

A high temperature cooling tube for use with an inspection device is provided. The cooling tube permits operation of the inspection device at a higher maximum temperature, e.g., the cooling tube is configured to operate in environments having a temperature on the order of about 500° F. (260° C.), compared to current devices only capable of operation at about 300° F. (149° C.). By providing the capability to inspect equipment in a relatively hot condition, e.g., 500° F. (260° C.) instead of 300° F. (149° C.) for jet engine inspection, the cooling time required before inspection is reduced, which reduces the overall turnaround time for equipment relying on such inspections, thus enabling equipment operators to place the equipment back into service and increase revenues.

In an exemplary embodiment, the cooling tube includes an inner sleeve for protecting the inspection device, an inner middle sleeve for insulation and air flow, an outer middle sleeve for strength and to protect the inner middle sleeve, and an outer sleeve for protecting the cooling tube and inspection device from damage. The inner middle sleeve can include expanded polytetrafluoroethylene (EPTFE), which protects the inspection device from extreme high temperature working environments, and which permits flexibility. The outer middle sleeve can be a spiral cut tubing that protects the inner middle sleeve and controls any leakage of cooling while permitting flexibility.

Figure 1:
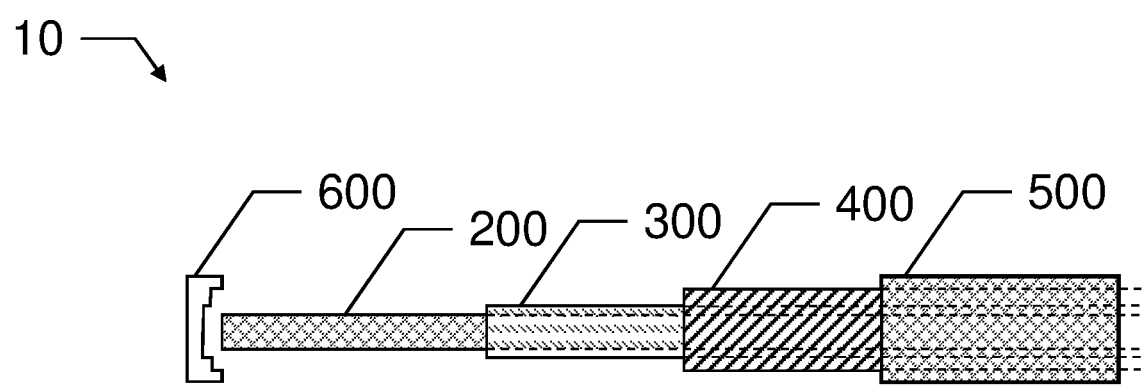
FIG. 1 is a side view of a cooling tube for a borescope according to one exemplary embodiment.
Figure 2:
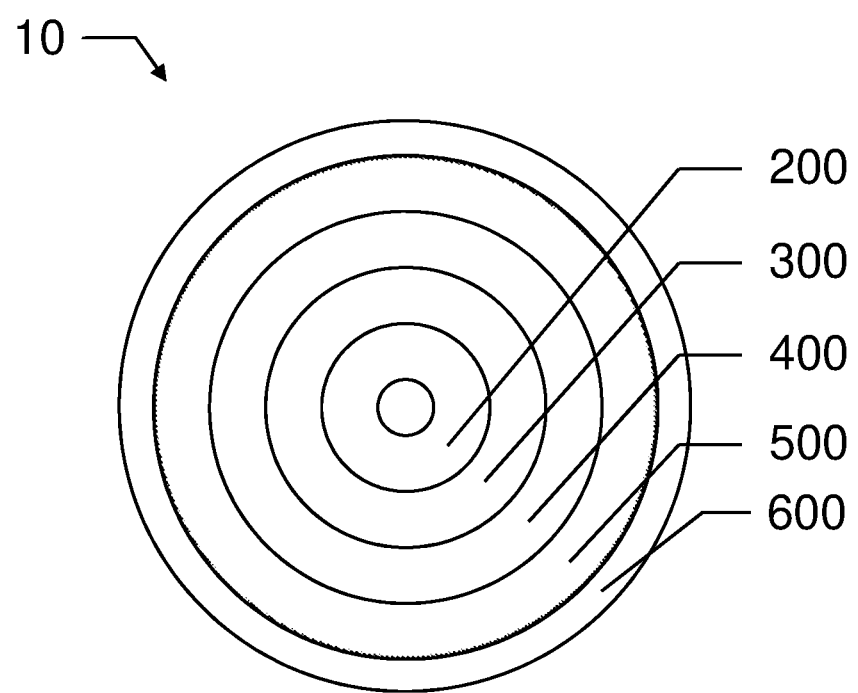
FIG. 2 is an end view of the cooling tube of FIG. 1.

FIGS. 1 and 2 illustrate one exemplary cooling tube 10 for use with an inspection device, such as a borescope. The cooling tube is an elongate, flexible tube having a length sufficient to be inserted into an object to be inspected and to extend to an area of interest. In some embodiments, an outer diameter of the cooling tube can be sized to fit through inspection apertures provided in the object to be inspected. An inner diameter of the cooling tube can be sized to enclose and protect an inspection tool, such as a borescope. In some embodiments, the inner diameter of the cooling tube is configured to enclose and protect the borescope. The size of the cooling tube can be modified based on the size of the borescope required for the intended different applications. In various embodiments, the cooling tube 10 can have a length of about 2.0 m (6.6 ft), about 3.0 m (9.8 ft), about 3.5 m (11.5 ft), about 4.5 m (14.8 ft), about 6.0 m (19.7 ft), about 10.0 m (32.8 ft), or about 30.0 m (98.4 ft). The length of the cooling tube 10 is not limited and can be any suitable length.

The cooling tube 10 can have multiple layers. In the embodiment shown in FIGS. 1 and 2, the layers of the cooling tube 10 include an inner sleeve 200 configured to receive an inspection tool 100, such as a borescope, a first middle sleeve 300 surrounding the inner sleeve 200, a second middle sleeve 400 surrounding the first middle sleeve 300, and an outer sleeve 500 surrounding the second middle sleeve 400. While first and second middle sleeves 300, 400 are shown, a single sleeve can be utilized instead. For example, the inner sleeve 200 can be omitted in some embodiments. The cooling tube 10 can also include an end cap 600.

When present, the inner sleeve 200 can be formed from a variety of materials, but, in an exemplary embodiment, the inner sleeve 200 is formed from tungsten. The tungsten can be provided in the form of a wound tungsten braid. The braided and/or spiral cut form of the tungsten permits flexibility of the cooling tube, key to maintaining the flexibility of the overall assembly.

The first middle sleeve 300 can also be formed from a variety of materials, but in an exemplary embodiment the first middle sleeve 300 is formed from an expanded polytetrafluoroethylene (EPTFE, e.g., expanded TEFLON foam and/or GORE-TEX) layer. The EPTFE allows the cooling tube to operate at relatively high operating temperatures (e.g., about 500° F. (260° C.)). EPTFE is relatively flexible thus allowing steering of the borescope during insertion into a given piece of equipment. EPTFE also is an excellent insulator and does not melt at relatively low temperatures. In certain embodiments, the EPTFE can be an open-cell foam, and can thus allow air to flow therethrough, thus promoting cooling of the cooling tube as a whole. The EPTFE surrounds the tungsten braided and/or spiral cut inner sleeve 200, and thus the inner sleeve 200 both protects the EPTFE layer and serves to close off cells on the inner surface of the inspection tube to limit cooling air escaping along the length of the tubing. Improved sealing of the outer surface of the cooling tube permits more air to envelope a tip of an inspection device, such as an optical core at a tip (a distal end) of a borescope.

In an additional embodiment, the arrangement of the materials is such that the innermost sleeve 200 can a polytetrafluoroethylene (PTFE) material. The PTFE material 200 can be in the form of a spiral cut wound around an arbor to establish a channel within. The second innermost sleeve 300 can be an EPTFE material, and the outermost material 400 can be a high temperature braided and/or spiral cut sheath material. The outermost layer 400 can be a high temperature polymer braided and/or spiral cut material. With the additional embodiment, the cooling air is entirely channeled inside the PTFE 200 and the EPTE 300 serves an insulation function, without airflow. Cooling air does not readily escape along a length of the tube 10, being entirely ducted to a distal end of the tube 10.

The second middle sleeve 400 can also be formed from a variety of materials, but in an exemplary embodiment, the second middle sleeve 400 is formed from a PTFE layer. The PTFE layer that forms the second middle sleeve 400 can be in the form of a spiral cut PTFE wound about the first middle sleeve 300. The second middle sleeve 400 can form an interference fit with the first middle sleeve 300. The solid, non-porous PTFE can prevent fluid (air) from entering or escaping along a length of the cooling tube 10, while allowing the cooling tube to flex.

The outer sleeve 500 can also be formed from a variety of materials, but in an exemplary embodiment the outer sleeve 500 is formed from tungsten. The tungsten can be provided in the form of a tungsten braid wound about the second middle sleeve 400. In other embodiments, the outer sleeve 500 can be formed from fiberglass or other material of sufficient temperature resistance. The fiberglass can be loosely woven, braided and/or spiral cut.

At a distal end of the cooling tube 10, a cap can be provided to seal the various layers of the cooling tube 10. The cap can be configured to permit the inspection tool 100 to pass therethrough. In addition to the cooling tube 10, the cap further protects the inspection tool 100 from heat and physical impact. In one exemplary embodiment, the cap 600 can be formed from stainless steel. In some embodiments, the cap 600 can be ring-shaped with a distal end surface, a proximal end surface, an outer radial surface, and an inner bore extending therethrough. The inner bore can have various configurations but, in the illustrated embodiment, the inner bore has a stepped configuration with a first inner radial surface, a second inner radial surface, and a third inner radial surface. Each of the inspection tool 100, the inner sleeve 200, the first middle sleeve 300, the second middle sleeve 400, and the outer sleeve can have an outer radial surface. Each of the inspection tool 100, the inner sleeve 200, the first middle sleeve 300, the second middle sleeve 400, and the outer sleeve 500 can have a distal end surface.

The first inner radial surface of the cap 600 can be configured to contact a portion of the outer radial surface 110 of the inspection tool 100. The first inner radial surface of the cap 600 can also be configured to permit the inspection tool 100 to protrude through the cap 600 beyond the distal end surface. The distal end surface of the inspection tool 100 can sit flush with the distal end surface of the cap 600. The distal end surface of the inspection tool 100 can be recessed into the distal end surface of the cap 600. The inner radial surface of the cap 600 can be configured to cover and/or contact the distal end surface of the inner sleeve 200. The second inner radial surface of the cap 600 can be configured to cover and/or contact a portion of the outer radial surface of the inner sleeve 200. The inner radial surface of the cap 600 can be configured to cover and/or contact a portion of the distal end surface of the first middle sleeve 300, the distal end surface of the second middle sleeve 400, and the distal end surface of the outer sleeve 500. The third inner radial surface of the cap 600 can be configured to cover and/or contact a portion of the outer radial surface of the outer sleeve 500.

The cooling tube 10 can be manufactured using a variety of techniques. In one embodiment, the inner sleeve 200, the first middle sleeve 300, the second middle sleeve 400, and the outer layer 500 can be built. In operation the inspection tool 100 can be inserted into the cooling tube 10. The first middle sleeve 300 can be inserted into the inner sleeve 200. The second middle sleeve 400 can be wound around the first middle sleeve 300. The assembly is the inserted into the outer layer 500.

The cap 600 can be attached to the cooling tube 10 using a variety of techniques. In some embodiments, a stainless steel cap 600 can be laser welded to a braided and/or spiral cut tungsten inner sleeve 200 and a braided and/or spiral cut tungsten outer sleeve 500. In some embodiments, the cap 600 can be attached by applying an adhesive to an inner surface of the cap 600, and by applying a vacuum to an intermediate assembly including the inspection tool 100, the inner sleeve 200, the first middle sleeve 300, the second middle sleeve 400, and the outer sleeve 500, which attaches the cap 600 to ePTFE foam in the first middle sleeve 300. The vacuum draws adhesive to fill open cells of the first middle sleeve 300 near a distal end of the cooling tube 10.

In use, an inspection tool 100, such as a borescope including a fiber optical bundle core, is inserted through the cooling tube 10. In various embodiments, the inspection tool 100 can have an outside diameter of about 4.0 mm (0.16 in), about 6.1 mm (0.24 in), about 8.4 mm (0.33 in), or about 10.0 mm (0.39 in). For an embodiment in which the inspection tool 100 has an outside diameter of about 4.0 mm (0.16 in), the outside diameter of the outer sleeve 500 of the cooling tube 10 can be about 6.1 mm (0.24 in). The outer sleeve 500 of the cooling tube 10 can have the outside diameter of about 6.1 mm when stressed in compression and exhibiting inward radial tension. The inner diameter of the inner sleeve 200 will be about 5.0 mm (0.20 in).

Figure 3:
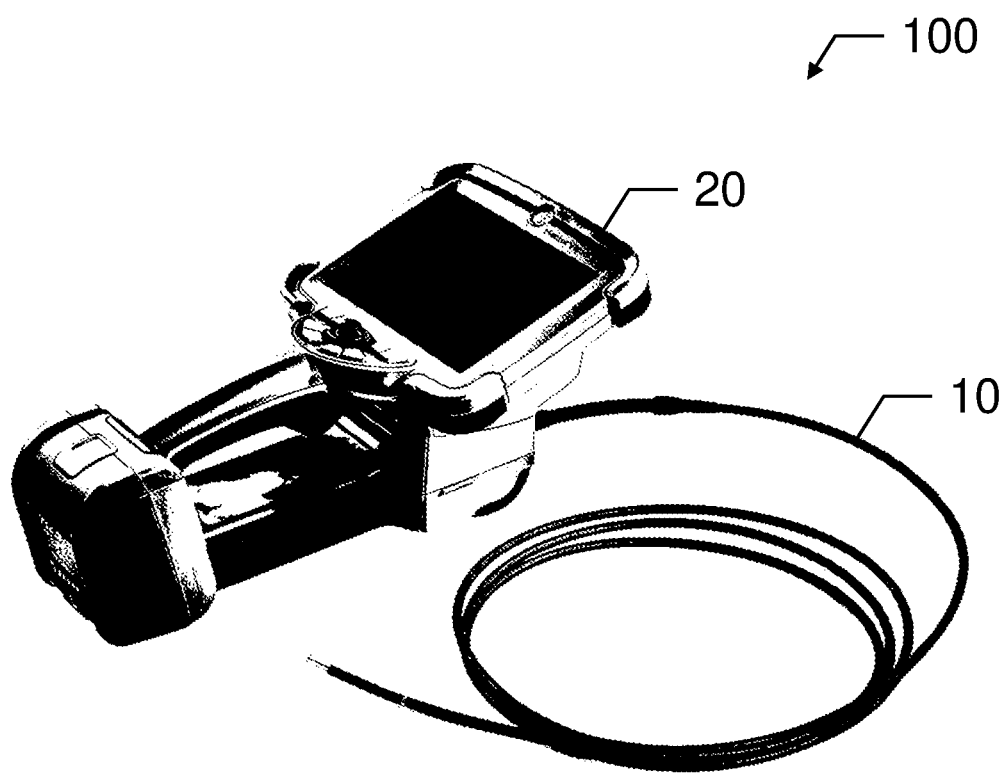
FIG. 3 is a perspective view of one embodiment of a borescope for use with the cooling tube.

FIG. 3 illustrates one exemplary embodiment of an inspection device in the form of a borescope having a hand-held unit 20 including a display, battery pack and operating buttons. The borescope can be used with the cooling tube 10, exemplary embodiments of which are shown in FIGS. 1 and 2.

With the borescope protected with the cooling tube 10, the cooling tube and inspection portion of the borescope can be inserted into an inspection aperture of a machine, such as an aircraft engine. Since the cooling tube 10 is configured to operate in environments having a temperature of at least about 500° F. (260° C.), a user of the borescope gains the capability to inspect equipment in a relatively hot condition.

Consequently, the cooling time required before inspection is reduced and advantages, noted in detail above, are achieved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The use of the terms "first", "second", "third" and so on, herein, are provided to identify various structures, dimensions or operations, without describing any order, and the structures, dimensions or operations can be executed in a different order from the stated order unless a specific order is definitely specified in the context.

Approximating language, as used herein throughout the specification and claims, can be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The embodiments set forth in the foregoing description do not represent all embodiments consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the embodiments described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other embodiments can be within the scope of the following claims.

The invention claimed is:

1. A cooling tube for use with an inspection device, the cooling tube comprising:
    a braided and/or spiral cut inner sleeve formed from tungsten or polytetrafluoroethylene and having an inner lumen extending therethrough and configured to receive the inspection device;
    a middle sleeve formed from an expanded polytetrafluoroethylene disposed around the inner sleeve; and
    a braided and/or spiral cut outer sleeve surrounding the middle sleeve;
    wherein the cooling tube is configured to operate in environmental temperatures greater than about 302° F. (150° C.).

2. The cooling tube of claim 1, wherein the middle sleeve comprises a first middle sleeve, and further comprising a second middle sleeve formed from a spiral cut polytetrafluoroethylene wound around the first middle sleeve and having the braided and/or spiral cut outer sleeve disposed therearound.

3. The cooling tube of claim 1, wherein the outer sleeve is formed from a braided and/or spiral cut tungsten.

4. The cooling tube of claim 1, wherein the outer sleeve is formed from a nonmetallic braid.

5. The cooling tube of claim 1, further comprising an end cap coupled to a first end of the cooling tube.

6. The cooling tube of claim 1, wherein the inner sleeve is removed and the lumen is formed by the middle sleeve.

7. The cooling tube of claim 5, wherein the end cap includes an opening configured to permit the inspection device to pass therethrough.

8. The cooling tube of claim 5, wherein the end cap is fixedly attached to the inner sleeve.

9. The cooling tube of claim 5, wherein the end cap has a bore extending therethrough with first, second, and third radially inward facing surfaces that differ in diameter from one another.

10. The cooling tube of claim 1, wherein the cooling tube is flexible.

11. A cooling tube for use with an inspection device, the cooling tube comprising:
    a sleeve formed from an expanded polytetrafluoroethylene having an inner lumen extending therethrough and configured to receive the inspection device; and
    a braided and/or spiral cut outer sleeve surrounding the sleeve,
    wherein the cooling tube is configured to operate in environmental temperatures greater than about 302° F. (150° C.).

* * * * *